United States Patent [19]

Hoekman et al.

[11] Patent Number: 4,581,524
[45] Date of Patent: Apr. 8, 1986

[54] FLEXIBLE FERROMAGNETIC MARKER FOR THE DETECTION OF OBJECTS HAVING MARKERS SECURED THERETO

[75] Inventors: Earl B. Hoekman, Roseville; Samuel Montean, Blaine, both of Minn.

[73] Assignee: Minnesota Mining and Manufacturing Company, St. Paul, Minn.

[21] Appl. No.: 488,687

[22] Filed: Apr. 26, 1983

[51] Int. Cl.$^4$ ............................................. G06K 19/06
[52] U.S. Cl. .................................... 235/493; 340/572
[58] Field of Search ...................... 235/493; 340/572; 428/900

[56] References Cited

U.S. PATENT DOCUMENTS

| | | | |
|---|---|---|---|
| 3,665,449 | 5/1972 | Elder et al. | 340/572 |
| 3,820,104 | 6/1974 | Fearon | 340/572 |
| 4,058,839 | 11/1977 | Darjany | 235/493 X |
| 4,152,476 | 5/1979 | Stillman | 235/493 X |
| 4,298,862 | 11/1981 | Gregor et al. | 340/572 |
| 4,342,904 | 8/1982 | Onsager | 235/493 |

Primary Examiner—David L. Trafton
Attorney, Agent, or Firm—Donald M. Sell; James A. Smith; William B. Barte

[57] ABSTRACT

A marker adapted to be used with cloth or fabric articles to enable the detection thereof in an electromagnetic article surveillance system within which the marker generates a detectable signal related to an alternating electromagnetic field applied within an interrogation zone, wherein the marker comprises an elongated strip of amorphous ferromagnetic ribbon sealed on all major surfaces within flexible polymeric cover layers having a low rate of water vapor transmission, and a high degree of thermal stability, puncture resistance and conformability, such that the articles having the marker included therein may be subjected to repeated flexing and high temperature and humidity conditions such as encountered in commercial laundry operations without affecting the magnetic properties of the marker, while also not appreciably stiffening the article itself, thus being readily attached to or concealed therein.

24 Claims, 4 Drawing Figures

FLEXIBLE FERROMAGNETIC MARKER FOR THE DETECTION OF OBJECTS HAVING MARKERS SECURED THERETO

TECHNICAL FIELD

This invention relates to a ferromagnetic marker adapted to be secured to an object for detecting the presence of that object within a defined zone.

BACKGROUND OF THE INVENTION

Theft of inventory or materials from commercial establishments is an ever-increasing problem. Systems attempting to mitigate such theft have been disclosed, with one such system described in U.S. Pat. No. 3,665,449 which issued May 23, 1972, and which is incorporated herein by reference. This system is representative of those known in that a "marker" element is secured to an object which is to be detected, and electrical circuits are included to detect a signal produced by that marker. The particular marker described within the above referenced system comprises a narrow ribbon of a specialized ferromagnetic material such as permalloy, which has a very high permeability (e.g., greater than $10^5$ gauss/oersted), and an aggregate saturation magnetic moment of at least 0.1 electromagnetic units (polecentimeters). A first circuit of the system described applies an alternating magnetic field within a defined interrogation zone. This applied field has a predetermined peak magnitude of less than 20 oersteds, and is periodically alternating at a frequency within the audio range. When an object bearing a marker is passed into the applied field and a vector component of that field becomes oriented with a major dimension (for example, length) of the marker, the magnetization of the marker reverses at each alternation of the applied field. Each magnetization reversal within the marker produces a characteristic pulse of external magnetic field. A second circuit of the system detects this pulse, thus verifying the presence, identity, or status of the object.

It is characteristic of the ferromagnetic material utilized within this system that even the slightest mechanical strain applied to the marker tends to cold work the material and degrade its permeability and other magnetic properties (see U.S. Pat. No. 3,665,449, Col. 6, lines 4-12). For this reason, it has been customary to install the marker within a rigid object, or to protect the ferromagnetic material within cover means which reduce the amount of bending or twisting. These cover means, typically molded plastic housings, tend to be bulky and of considerable weight as compared to the ferromagnetic material within. The undesirable weight and bulkiness of such a marker has severely restricted the use of the system with fragile and deformable items like clothing, wherein besides being aesthetically unattractive, a heavy marker hanging thereon could actually stretch the fibers of the garment and affect its saleability. Hence, a lightweight marker is desirable but can be used only if it can still limit mechanical strain from being applied to the ferromagnetic material therein.

One known technique disclosed in U.S. Pat. No. 4,342,904 (Onsager) for avoiding the degradation of the magnetic properties of such a strain-sensitive ferromagnetic marker is to encompass the ferromagnetic material between a pair of thin, lightweight sheets of a fairly rigid material, and wherein a low-friction release paper is provided between at least one of the cover sheets and one face of the magnetic strip, to afford slippage between the strip and that cover sheet, thus allowing some bending of the assembly without the transfer of mechanical strain to the ferromagnetic strip. In addition, such a marker also includes a layer of pressure-sensitive adhesive coated foam tape placed adjacent at least one face of the ferromagnetic strip, which tape serves to further cushion the ferromagnetic strip from mechanical strain and stresses.

It is also known to provide similar markers wherein the ferromagnetic material is substantially immune to work hardening. As disclosed in U.S. Pat. No. 4,298,862 (Gregor et al.), such a material may be a ductile strip of amorphous metal such as that manufactured by Allied Corporation under the trademark "Metglas". While such a material is nominally ductile as defined in that patent, the material is nonetheless relatively springy, and in thin sheet form has sharp edges which restrict the use thereof directly on or in cloth or fabric articles.

SUMMARY OF THE INVENTION

In contrast to the amorphous ferromagnetic marker of Gregor et al, referenced above, the marker of the present invention is provided with additional components which enhance the performance of the marker thus enabling the use thereof in cloth and fabric articles such as garments and linens such as sheets, pillowcases, towels and the like. The marker of the present invention is thus similarly adapted for use in an electromagnetic article surveillance system wherein the marker generates a detectable signal related to an alternating electromagnetic field applied within an interrogation zone. The marker particularly comprises an elongated section of a ferromagnetic amorphous metal having a ratio of length to square root of cross-sectional area of at least 150, sealed on all major surfaces between cover layers of a substantially continuous and flexible polymeric material in the range of 0.025 and 0.3 mm thick. In a preferred embodiment, such a section is a strip of amorphous metal having a thickness of less than 0.075 mm sealed between substantially planar cover layers. In the context of the present invention, by "amorphous" it is meant a material which is substantially, i.e. at least 50% glassy, and which exhibits no readily detectable long range order such that X-ray diffraction patterns exhibit only a diffuse halo.

The polymeric material utilized in the cover layers of the instant marker is specified to exhibit at temperatures up to 85° C., a rate of water vapor transmission and degrees of hydrolytic stability and puncture resistance sufficient to enable the marker to be subjected to at least fifty commercial laundrying cycles without appreciable change in those parameters, while also having a high degree of conformability or drapeability. The last parameter enables the marker to be affixed to or inserted in cloth or fabric articles without appreciable stiffening of the article. This cloth-like feel of the marker results in the marker being readily concealed, so as to minimize unauthorized removal or damage to the marker, and in the avoidance of appreciable stress upon flexing of an article supplied with the marker, which tends to cause the marker to protrude through the article or separate therefrom. Desirably, an adhesive layer is provided on at least one outer surface to facilitate attaching the marker to such articles.

The earlier recited parameters of the polymeric material are important in that the marker is thereby enabled to be utilized on cloth or fabric articles which are repeatedly exposed to high humidity and temperature conditions. For example, if the amorphous ferromagnetic material utilized in the marker is subject to corrosion under such conditions, which may cause the magnetic properties to deteriorate, such moisture attack is minimized. Similarly, staining or discoloration of the articles due to corrosion products or the like is also prevented. A high degree of hydrolytic stability is thus also important so as to prevent the polymeric material from becoming either crystalized and hence stiff or partially decomposed, gummy or the like.

DETAILED DESCRIPTION

Figure 1:
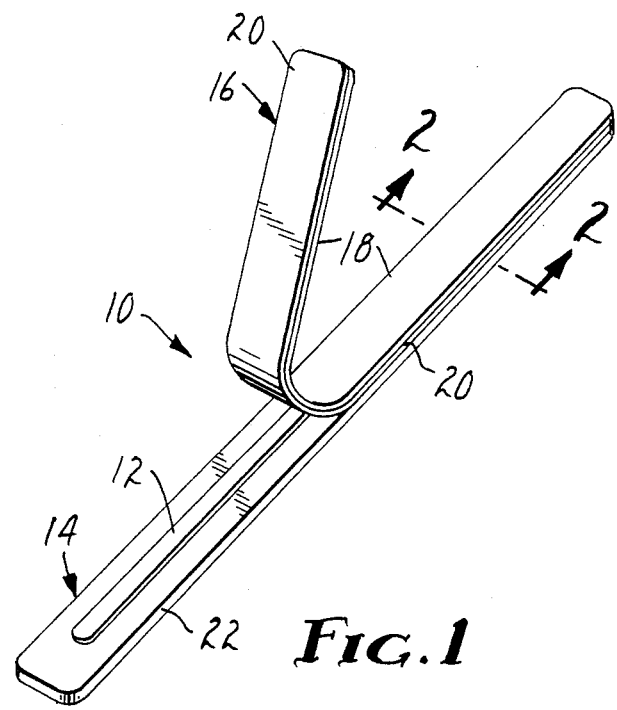
FIG. 1 is a partially delaminated perspective view of one embodiment of the marker of the present invention.

A preferred construction of a marker of the present invention is illustrated in the partially delaminated, perspective view of FIG. 1, wherein the marker 10 is shown to include a thin strip of an amorphous ferromagnetic material 12 between cover sheets 14 and 16. The amorphous ferromagnetic material 12 may be a variety of high permeability, low coercive force ferromagnetic compositions such as are manufactured by Allied Corporation under the tradename "Metglas", and which as described in U.S. Pat. No. 4,298,862 referenced hereinabove, are substantially immune to work hardening so that the ability of the material to generate harmonics of an applied alternating electromagnetic field is not impaired upon repeated flexing of the material. Thus for example, Allied compositions identified as types 2826MB2 or 2705M may be preferably used. Such compositions are believed to include the following ingredients (atomic %):

| Element | 2826MB2 | 2705M |
| --- | --- | --- |
| Co | 0 | 68.5 |
| Fe | 40 | 4.2 |
| Ni | 40 | 3.4 |
| Mo | 2.7 | 1.5 |
| Si | 0 | 10.0 |
| B | 16.7 | 12.4 |

The strips of such materials are further selected to have a sufficiently large value for the ratio of its length to the square root of its cross-sectional area ($L/\sqrt{A}$) to afford the generation of a detectable signal according to the teachings of U.S. Pat. No. 3,665,449 referenced hereinabove. Typically, such a material may be approximately 1.6 mm wide by 7.6 cm long and approximately 0.02 mm thick. In order to maximize the ratio of $L/\sqrt{A}$, it has generally been found desirable that the material be as thin as practical, depending upon off-setting production cost considerations.

Each of the respective cover layers 14 and 16 are formed of a substantially planar sheet of a substantially continuous and flexible polymeric material. Such a material is preferably provided in a thickness ranging between 0.025 and 0.3 mm thick, and preferably, as shown in FIG. 1, may be formed of sections approximately 5 mm wide and 8.3 cm long, each sheet being approximately 0.075 mm thick. As is further shown in FIG. 1, the cover layer 16 is formed of a ribbon 20 of a polymer, such as a polyesterurethane film, having on the outer surface thereof a layer of adhesive 18. Similarily, the cover layer 14 is formed of a like ribbon 22 which may optionally have on the outer surface thereof another adhesive layer. The adhesive layer 18 may be formed of a variety of types, for example, thermoplastic or hot-melt, pressure-sensitive, water-soluble, etc., depending upon the type of article and methods desirably used to affix the marker to the article, and may, for example, be the polymeric ribbon 20 itself. Depending upon the nature of the polymeric ribbons themselves, the two halves may be simply heat sealed together, thereby sealing the amorphous strip 12 therebetween. Alternatively, an additional layer of adhesive may be provided to bond together the polymeric ribbons The outer adhesive layer 18 may be pressuresensitive, hot-melt or other types well known to those skilled in the art, enabling the completed marker 10 to be bonded onto an article intended to be protected thereby.

Preferably, the elements of the marker, including the ferromagnetic strip 12, and each of the respective cover halves are rounded on each end, such as shown at ends 26 and 28. Thus, for example, both ends of the amorphous strip 12 may be formed with rounded ends 26, thereby avoiding the presence of sharp edges which concentrate stress upon bending or flexing of the marker, causing the strip to tend to pierce through the cover layers 14 and 16. Similarly, the polymeric cover layers 14 and 16 are preferably formed with rounded ends 28, thereby avoiding the presence of sharp edges tending to protrude out of cloth or fabric articles within or upon which the marker may be affixed.

Figure 2:
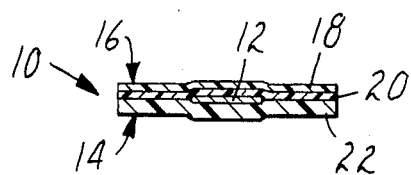
FIG. 2 is a cross-sectional view of the marker of FIG. 1, taken along the line 2—2.

A cross-sectional view of the marker shown in FIG. 1 is shown in FIG. 2 taken along the lines 2—2 of FIG. 1. As may there be seen, the amorphous ferromagnetic strip 12 is totally encompassed within cover layers 20 and 22, while the outer adhesive layer 18 functions to secure the marker to cloth or fabric articles.

As noted above, cloth or fabric articles to which the marker of the present invention is desirably secured may frequently be exposed to high temperature and humidity conditions such as typically present in commercial and hospital laundering operations. It is thus required that the cover layers be thermally stable up to at least 85° C. and to maintain certain parameters up to that temperature. For example, depending upon the degree of corrosion resistance of the selected ferromagnetic material, it may be necessary to protect that material from chemical attack which could otherwise result in degradation of the magnetic properties. Similarly, corrosion products as could be formed must be prevented from bleeding through the corners and thereupon causing staining or discoloration of articles to which the markers are affixed. Accordingly, the cover layers are desirably formed of a substantially continuous polymeric material having a rate of water-vapor transmission less than 1500 grams per square meter per 24 hours, as determined under a standard method for testing for water vapor transmission, such as specified by ASTM designation E96-53T (1953) or F372-73 (1978). A suitable material for use in the cover layers would thus be a polyester-urethane film, having a vapor transmission ratio in the range of 600 to 1100 grams per $m^2$ per 24 hour. Other polymeric materials having appreciably lower rates of water vapor transmission would be even more desirable based on that parameter alone. Furthermore, depending upon the chemicals present in such laundrying operations, resistance to chemical attack, such as by alkaline detergents, dry cleaning solvents and the like will be desired.

The thermal stability of other parameters has also been found to be required. For the cover halves to withstand the stresses imposed during laundrying operations and to keep the ferromagnetic strip sealed therebetween, the polymeric material must exhibit a high degree of puncture resistance over a wide range of temperatures. Similarly, it is necessary that the marker retain its original properties over repeated exposure to laundry cycles. Such operations typically include a wash cycle including strong detergents at temperatures up to 180° F. (82° C.), typically 160° F. (70° C.) for 30 minutes, followed by room temperature extraction drying, i.e., either centrifuge drying at 300 psi or hydraulic pressing at 700–800 psi. Alternately, high temperature drying at 250°–275° F. (120°–135° C.) for at least 20 minutes may also be used. Finally, the articles are pressed (ironed) at a maximum temperature of 350° F. (175° C.), with articles normally being exposed to 240° F. (115° C.) for 10 sec. Accordingly, the material of the cover halves must exhibit a high degree of hydrolytic stability, such that the material does not become either crystallized or decomposed, with a resulting decrease in any of the physical or chemical properties noted above.

As also noted above, it is required that the marker exhibit a cloth-like feel, i.e. a high degree of drapeability, thus enabling ready concealment of the marker and minimizing any propensity of the marker to pierce through a fabric article or to delaminate therefrom. Acceptable materials have been found to not add any appreciable stiffness to the marker over that resulting from the presence of the ferromagnetic strip alone. Thus, for example, a bare strip when cantilevered a given distance past a horizontal surface, will be observed to sag or droop a certain amount. A line extending between the leading edge of the strip and the edge of the horizontal surface will thus form a measurable angle to the horizontal. It is desirable that the measured angle formed by a completed marker extended a similar distance not be appreciably different.

The relative degree (10 being the highest) to which various family groups of polymers satisfy the criteria outlined above may be seen in the following table. It is, of course, recognized that various blends, copolymers, plasticizers, etc. may result in an appreciable variation in properties.

vapor transmission becomes more important, and conversely, if a thinner and/or more flexible ferromagnetic material is used, the puncture resistance becomes somewhat less important.

It has been found that a polyester-urethane film is particularly desirable, in that not only is the water vapor transmission rate sufficiently low, but also in that such a material enables the marker to withstand high temperature environments noted above, is relatively tough, and yet exhibits a high degree of conformability, thus enabling the marker to be affixed or inserted into cloth or fabric articles without appreciably stiffening the article, while yet resisting any tendency of the ferromagnetic member to protrude through the cover layers and hence damage the fabric or cloth article. Such a material may be made from methylene diisocyanate, 1,4-butane diol, and adipic acid, with $TiO_2$ pigment added to provide a white colored film, thus enhancing the concealability of the marker when affixed to white articles such as hospital linens. While many if not most polymeric materials, particularly those polymers which are non-polar and generally non-plasticized will have rates of water vapor transmission which are much less than the upper limit recited above, such materials may be more or less desirable depending upon the other parameters. Similarly, the upper and lower cover layers may be formed of different polymers appropriately bonded together.

Figure 3:
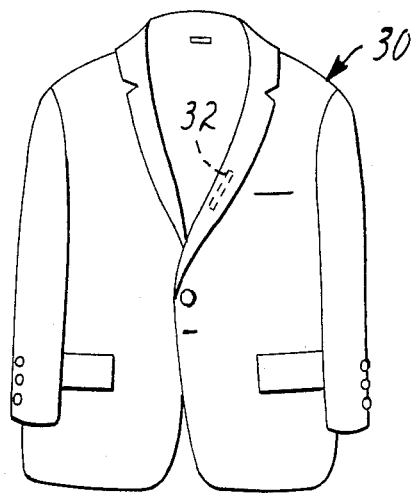
FIG. 3 is a frontal view of an article having a marker according to the present invention secured thereto.

As shown in FIG. 3, a typical article to which the marker of the present invention may be attached could be a garment 30, which may, for example, be a hospital attendant's uniform, a man's suit or the like. Other articles such as linens, women's apparel, furs, etc. may similarly be protected. In such instances, a marker 32 would typically be inserted in the hem or heat sealed to the outer surface in another inconspicuous location, thereby enabling the article to be detected in the event of an unauthorized attempt to remove the article from a protected area.

Figure 4:
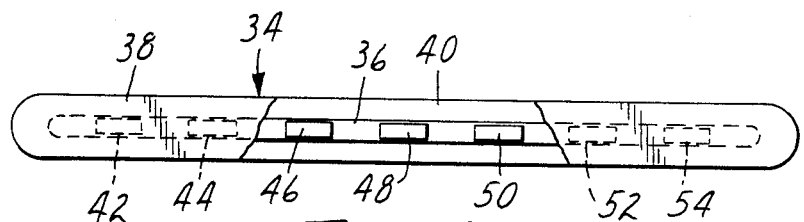
FIG. 4 is a cut-away frontal view of another embodiment of the marker of the present invention.

In certain applications, such as in the marking of hospital linens, permanent identification of the articles is desired, a marker as described above is iminently suitable. However, in other applications wherein it may be desired to deactivate the marker, such as at the point of sale, thereby enabling one carrying or wearing the article to subsequently pass through interrogation zones without detection, it may be desired to provide a deactivatable marker. Such a marker 34, is shown in a broken away view of FIG. 4, and includes an elongated amorphous ferromagnetic strip 36, within outer layers of a

| Property | Polymeric Family | | | | | | |
|---|---|---|---|---|---|---|---|
| | urethanes | vinyls | ethylenes | esters | propylenes | amides (nylons) | rubber |
| rate of water vapor transmission | 1 | 5 | 8 | 3 | 8 | 1 | 5 |
| drapeability | 9 | 8 | 7 | 1–10 | 3 | 3 | 9 |
| puncture resistance | 10 | 1–8 | 10 | 1–9 | 1–7 | 4 | 10 |
| hydrolytic stability | 1–3 | 5 | 8 | 1–3 | 8 | 3 | 8 |

The relative weight to be given to the various properties identified above must further be determined based on the application, and on the relative thickness, flexural modulus and corrosiveness of the selected ferromagnetic material. Generally, it has been found that drapeability, puncture resistance and hydrolytic stability are about equally important. If the ferromagnetic material is appreciably corrosive, then the rate of water polymeric material 38 and 40. To this extent, such a marker is substantially like that shown in FIGS. 1 and 2. The deactivatable attributes of the marker 34 are achieved by additionally providing a plurality of magnetizable sections 42, 44, 46, 48, 50, 52, and 54. Such sections are formed of a magnetizable material which when magnetized bias the amorphous ferromagnetic strip, causing the signal produced by that strip when in the interrogation zone of an electromagnetic article surveillance system to be detectably different than that produced when the sections are in an unmagnetized condition. Thus, as disclosed in U.S. Pat. No. 3,665,449, for example, such sections may be formed of a ferromagnetic magnetizable material such as vicalloy, high In one series of tests various articles had markers such as described above affixed to them and the articles were then subjected to repeated commercial laundrying cycles. The relative effectiveness of the markers in a simulated electromagnetic article surveillance system was measured at five cycle intervals. The result of those tests are shown in the following table:

| NO. OF WASHINGS | SAMPLE 1 | | SAMPLE 2 | | SAMPLE 3 | | SAMPLE 4 | |
|---|---|---|---|---|---|---|---|---|
| | BEFORE | AFTER | BEFORE | AFTER | BEFORE | AFTER | BEFORE | AFTER |
| 5 | 1.22 | 2.40 | .25 | .06 | .36 | .16 | .28 | .14 |
| 10 | 1.26 | 1.20 | .22 | .20 | .30 | .12 | .25 | .20 |
| 15 | 1.26 | 2.00* | .28 | .08 | .27 | .13 | .31 | .19 |
| 20 | 1.16 | 2.10* | .21 | .30 | .30 | .12 | .27 | .16 |
| 25 | 1.20 | 1.80 | .24 | — | .29 | .16 | .31 | .10 |
| 30 | 1.14 | 1.50* | .24 | .14 | .26 | .14 | .34 | .14 |
| 35 | 1.10 | 1.50* | .25 | .50 | .31 | .20 | .30 | .18 |
| 40 | 1.22 | 1.40 | .18 | .31 | .29 | .20 | .30 | .09 |
| 45 | 1.04 | .90 | .27 | .47 | .27 | .14 | .33 | .22 |
| 50 | 1.26 | 1.40 | .18 | .36 | .27 | .10 | .27 | .26 | carbon steel or the like. As is there set forth, when an article to which a marker, such as the marker 34, is desirably allowed to pass through an interrogation zone undetected, the sections 42 through 54 are magnetized, causing the signal produced by the strip to be detectably different. Conversely, if detection of the strip is again desired, the sections may be subsequently demagnetized, thereby restoring the strip to the original sensitized condition, such that the detection of the object may be effected as before.

As noted above, various pigments or other coloring agents may be added to the outer polymeric layer of the marker, such colorants being selected to blend with the color of the article to which the marker is affixed, thereby enhancing the concealability of the marker on such articles Similarly, additional outer layers may also be provided. For example, an outer fabric layer may be added to the marker, which fabric is selected to be similar to the fabric of the article upon which the marker is desirably affixed. A fabric layer may also be desirably utilized as it may reinforce the polymeric layers and thereby further lessen any propensity for the marker to protrude through the article to which the marker is affixed. In a similar manner, an outer polymeric layer may be surface treated such as by knurling or the like to lessen the sheen of the marker and to provide a fabric-like surface texture, thereby further aiding in concealability.

The marker of the present invention is desirably utilized with articles which may be subjected to even more extreme temperature and humidity conditions than those specified above. For example, certain hospital linens and outer garments intended for use with burn victims, in surgical wards and the like are frequently sterilized by exposure to steam at 30 psi at 135° C. for a time ranging between 6 to 30 minutes, normally about 8 to 10 minutes. Markers intended for use with such articles are therefore required to be formed of outer cover layers particularly suited to withstand such conditions. Thus the particular material utilized may exhibit an overall thermal stability up to approximately 150° C., albeit at a sacrifice of a less satisfactory flexural modulus and other properties. Likewise, the amorphous ferromagnetic material may be selected to be relatively non-corrosive, thus lessening the criticality of the rate of water vapor transmission parameter otherwise imposed on the material of the cover layers.

The indicated sensitivity of each sample marker is relative, there being no absolute calibration. While considerable scatter exists in the data, it may be seen that even after protracted washing cycles, the sensitivity of the markers remained substantially unchanged, with the markers still affixed to the articles as at the beginning of the tests, except in a limited number of samples as noted.

Sample 1 was prepared from a section of Allied Corp. amorphous material type 2826 MB2, 15 cm long by 1.8 mm wide and 0.05 mm thick and was heat sealed between two layers of polyester-urethane film 0.075 mm thick. Sample 2 was similarly dimensioned and prepared, except that it was 10.2 cm long. Sample 3 was prepared from the same outer layers, but from Allied Corp. material type 205SC, dimensioned 10.2 cm long by 3.17 mm wide by 0.25 mm thick. Such material is believed to have the following compositions (atomic %): Fe 81; B 13.5; Si 3.5; C 2. Sample 4 was the same as Sample 3, except that it was formed of Allied Corp. 2826 MB2 material. All samples were formed with either squared off ends or with particularly configured ends (cut at various angles, etc. to enable identification after the various washing cycles). The squared ends on the 15 cm sample (Sample 1) was found to protrude from the sample in the tests marked with the asteriks, thus showing a desirability to round the ends in certain situations.

Having described a preferred embodiment of the present invention it will be understood that changes may be made in the size, shape, configuration or alternative compositions of the respective marker sections of at least some of the parts described herein without departing from the present invention as recited in the appended claims.

We claim:
1. A marker adapted for use in an electromagnetic article surveillance system wherein said marker generates a detectable signal related to an alternating electromagnetic field applied within an interrogation zone, said marker comprising
an elongated section of a ferromagnetic amorphous metal having a ratio of length to square root of cross-sectional area of at least 150, sealed on all major surfaces between cover layers of substantially continuous and flexible polymeric material in the range of 0.025 to 0.3 mm thick, said polymeric material exhibiting at temperatures up to 85° C. a rate of water-vapor transmission and degrees of hydrolytic stability and puncture resistance sufficient to enable the marker to be subjected to at least fifty commercial laundrying cycles without appreciable change in those parameters, while also having a high degree of conformability and drapeability so as to enable the marker to be affixed to or inserted in cloth of fabric articles without appreciable stiffening of the articles.

2. A marker according to claim 1, wherein said metal strip is formed with rounded ends, thereby avoiding the presence of sharp edges which tend to concentrate stress upon bending or flexing of the marker, thus causing the strip to pierce the polymeric cover layers.

3. A marker according to claim 1, wherein said polymeric layers are formed with rounded ends, thereby avoiding the presence of sharp edges tending to protrude out of or from cloth or fabric articles within or upon which the marker may be affixed.

4. A marker according to claim 1, further comprising an adhesive layer on at least one outer surface.

5. A marker according to claim 4, wherein said adhesive layer is pressure sensitive.

6. A marker according to claim 1, wherein said polymeric layers are adhesively bonded together outside the edges of said metal strip.

7. A marker according to claim 1, wherein said metal strip is totally sealed within said layers.

8. A marker according to claim 1, wherein said polymeric material comprises a polyester-urethane film.

9. A marker according to claim 1, further comprising at least one section of magnetizable material which when magnetized biases said strip causing the signal produced thereby when in said interrogation zone to be detectably different than when said section is in an unmagnetized condition.

10. An article adapted to be readily detected in an electromagnetic article surveillance system, said article comprising a flexible cloth or fabric construction and having affixed thereto a marker which generates a detectable signal related to an alternating electromagnetic field produced by said system within an interrogation zone, said marker being in the form of an elongated section of a ferromagnetic amorphous metal having a ratio of length to square root of cross-sectional area of at least 150 and, sealed on all major surfaces between cover layers of substantially continuous and flexible polymeric material in the range of 0.025 to 0.3 mm thick, said polymeric material exhibiting at temperatures up to 85° C. a rate of water vapor transmission and degrees of hydrolytic stability and puncture resistance sufficient to enable the marker to be subjected to at least fifty commercial laundrying cycles without appreciable change in those parameters, while also having a high degree of conformability and drapeability so as to avoid appreciable stiffening of the article.

11. An article according to claim 10, wherein said metal strip within the marker is formed with substantially rounded ends, thereby avoiding the presence of sharp edges which tend to concentrate stress upon bending or flexing of the marker, thus causing the strip to pierce the polymeric cover layers.

12. An article according to claim 10, wherein said polymeric layers of the marker are formed with substantially rounded ends, thereby avoiding the presence of sharp edges tending to protrude out of said article within which the marker is concealed.

13. An article according to claim 10, further comprising an adhesive layer securing said marker to said cloth of fabric.

14. An article according to claim 13, wherein said adhesive layer is pressure sensitive.

15. An article according to claim 10, wherein said polymeric layers on the marker are adhesively bonded together outside the edges of said metal strip.

16. An article according to claim 10, wherein said metal strip of the marker is totally sealed within said layers.

17. An article according to claim 10, wherein said polymeric material comprises a polyester-urethane film.

18. An article according to claim 10, wherein said marker further comprises at least one section of a magnetizable material which when magnetized biases said ferromagnetic strip, causing the signal produced thereby when in said interrogation zone to be detectably different than when said section is in an unmagnetized condition.

19. A marker according to claim 1, wherein said metal section is a strip having a thickness of less than 0.075 mm sealed between substantially planar covers.

20. A marker according to claim 1, further comprising an additional outer fabric layer.

21. A marker according to claim 4, wherein said adhesive layer is thermoplastic.

22. A marker according to claim 1, wherein said polymeric layers are thermoplastically bonded together.

23. An article according to claim 13, wherein said adhesive layer is thermoplastic.

24. An article according to claim 10, wherein said polymeric layers are thermoplastically bonded together.

* * * * *